US012654737B2

(12) United States Patent　(10) Patent No.: US 12,654,737 B2
Choi et al.　(45) Date of Patent: Jun. 16, 2026

(54) AUTONOMOUS DRIVING CONTROL APPARATUS AND METHOD THEREOF

(71) Applicants: Hyundai Motor Company, Seoul (KR); Kia Corporation, Seoul (KR); HYUNDAI AUTOEVER Corp., Seoul (KR)

(72) Inventors: Yu Ho Choi, Seoul (KR); Bong Ju Kim, Yongin-Si (KR); Kyeng Taek Kim, Anyang-Si (KR)

(73) Assignees: Hyundai Motor Company, Seoul (KR); Kia Corporation, Seoul (KR); HYUNDAI AUTOEVER Corp., Seoul (KR)

( * ) Notice: Subject to any disclaimer, the term of this patent is extended or adjusted under 35 U.S.C. 154(b) by 73 days.

(21) Appl. No.: 18/668,739

(22) Filed: May 20, 2024

(65) Prior Publication Data

US 2025/0153732 A1　May 15, 2025

(30) Foreign Application Priority Data

Nov. 15, 2023　(KR) ........................ 10-2023-0158467

(51) Int. Cl.
*B60W 50/00*　(2006.01)
*B60W 40/04*　(2006.01)
*B60W 60/00*　(2020.01)
*G07C 5/08*　(2006.01)

(52) U.S. Cl.
CPC .......... *B60W 60/001* (2020.02); *B60W 40/04* (2013.01); *B60W 2520/10* (2013.01); *B60W 2540/12* (2013.01); *G07C 5/085* (2013.01)

(58) Field of Classification Search
CPC .............. B60W 60/001; B60W 40/04; B60W 2520/10; B60W 2540/12; B60W 2050/0005; B60W 2554/802; B60W 2556/05; B60W 2556/10; B60W 50/00; B60W 2420/403; B60W 2420/408;
(Continued)

(56) References Cited

U.S. PATENT DOCUMENTS

| | | |
|---|---|---|
| 2021/0248842 A1 | 8/2021 | Dittrich et al. |
| 2021/0271413 A1 | 9/2021 | Herzogenrath et al. |
| 2022/0207930 A1 | 6/2022 | Kim et al. |

(Continued)

FOREIGN PATENT DOCUMENTS

| | | |
|---|---|---|
| KR | 10-2021-0062530 A | 5/2021 |
| KR | 10-2022-0094718 A | 7/2022 |

OTHER PUBLICATIONS

English Translation of KR20210062530A.*

*Primary Examiner* — Ramya P Burgess
*Assistant Examiner* — Chanmin Park
(74) *Attorney, Agent, or Firm* — Banner & Witcoff, Ltd.

(57) ABSTRACT

An apparatus for a vehicle comprises a sensor device, memory storing instructions, and a controller linked to both, enabling autonomous driving of a vehicle. The apparatus stores first sensor data associated with autonomous driving in a buffer, transferring it to a storage device based on a preliminary condition. The apparatus also temporarily stores second sensor data associated with the first data. Depending on a trigger condition, the apparatus transfers second data to the storage device while maintaining the first data, or removes the first data if the trigger condition is not met.

20 Claims, 6 Drawing Sheets

(58) Field of Classification Search
CPC ....... B60W 2520/06; B60W 2520/105; B60W
50/045; B60W 60/00; G07C 5/085
See application file for complete search history.

(56) References Cited

U.S. PATENT DOCUMENTS

2022/0335730 A1 * 10/2022 Tal ........................ G08G 1/0141
2023/0058603 A1     2/2023 Herzogenrath et al.
2025/0095424 A1 *  3/2025 Müller ................... G07C 5/008

* cited by examiner

| CONDITION ITEM ABOUT TRIGGER | REGULAR TRIGGER THRESHOLD | TEMPORARY TRIGGER THRESHOLD |
|---|---|---|
| WHETHER BRAKE PEDAL OPERATES | No | No |
| TARGET SETTING SPEED | 60 [km/h] | - |
| CURRENT SPEED MEASUREMENT VALUE | 50 [km/h] | 40 [km/h] |
| FORWARD OBJECT POSITION ESTIMATION VALUE | 50 [m] | 100 [m] |

FIG.5

AUTONOMOUS DRIVING CONTROL APPARATUS AND METHOD THEREOF

CROSS-REFERENCE TO RELATED APPLICATION

This application claims the benefit of priority to Korean Patent Application No. 10-2023-0158467, filed in the Korean Intellectual Property Office on Nov. 15, 2023, the entire contents of which are incorporated herein by reference.

TECHNICAL FIELD

The present disclosure relates to an autonomous driving control apparatus and a method thereof, and more particularly, relates to technologies for efficiently storing pieces of data identified while a host vehicle is traveling.

BACKGROUND

As autonomous vehicles continue to evolve, the demand for increasingly sophisticated data management solutions for stable driving becomes desirable. For example, there may be a need for more and more data for stable driving of the autonomous vehicle. Thus, a technology for efficiently storing and managing data may be desirable.

For example, according to the established laws and regulations, an autonomous driving control apparatus should store at least some of pieces of data generated (or identified) while performing autonomous driving control for a host vehicle in its memory.

However, as an autonomous driving technology is developed, sizes of pieces of data to be stored by the autonomous driving control apparatus and a time when the pieces of data are stored are increasing more and more. In addition, when a limiting situation, such as a situation in which pieces of data should be consecutively stored or a situation in which the autonomous driving control apparatus is rest, occurs, there is a need for a method for efficiently storing and managing driving data in the autonomous driving control apparatus.

Furthermore, a trigger signal is generated in the process of identifying data needed to be stored. As the trigger signal is consecutively generated or the host vehicle identifies an emergency situation, when an operation mode switches to a specified mode (e.g., an operation mode according to event data recorder (EDR) and/or emergency maneuver (EM)), it may be difficult to accurately store data.

SUMMARY

According to the present disclosure, an apparatus for a vehicle, the apparatus comprising a sensor device, a memory storing at least one instruction, and a controller operatively coupled to the sensor device and the memory, wherein the at least one instruction is configured to, when executed by the controller, cause the apparatus to control, by using the sensor device, autonomous driving of the vehicle, temporarily store, in at least one buffer of a first memory of a first type, first sensor data, wherein the first sensor data is associated with the autonomous driving of the vehicle, and the first sensor data is obtained using the sensor device, transfer, from the at least one buffer to a storage device of a second type and based on the first sensor data satisfying a preliminary condition, the first sensor data, temporarily store, in the at least one buffer of the first memory, second sensor data, wherein the second sensor data is associated with the first sensor data, and perform one of: based on the second sensor data satisfying a trigger condition, transferring, from the at least one buffer to the storage device, at least a portion of the second sensor data and maintaining the first sensor data in the storage device; or based on the second sensor data not satisfying the trigger condition, removing the first sensor data from the storage device.

The apparatus, wherein the at least one instruction is configured to, when executed by the controller, cause the apparatus to prevent storing information in the storage device, wherein the information is duplicate pieces of information in both the first sensor data and the second sensor data.

The apparatus, wherein the first type corresponds to volatile memory and the second type corresponds to non-volatile memory.

The apparatus, wherein each of the preliminary condition and the trigger condition comprises at least one of whether a brake pedal operates, a target setting speed value, a current speed measurement value, or a forward object position estimation value.

The apparatus, wherein the preliminary condition comprises at least one of: the brake pedal not operating; the current speed measurement value being greater than or equal to a first measurement value; or the forward object position estimation value being less than or equal to a first distance value.

The apparatus, wherein the trigger condition comprises at least one of: the brake pedal not operating; the target setting speed value being greater than or equal to a first setting speed value; the current speed measurement value being greater than or equal to a second measurement value that is greater than the first measurement value; or the forward object position estimation value being less than or equal to a second distance value smaller than the first distance value.

The apparatus, wherein the first sensor data comprises first pieces of data for the autonomous driving, wherein the first pieces of data are identified based on a first time point at which the preliminary condition is satisfied; and wherein the second sensor data comprises second pieces of data for the autonomous driving, wherein the second pieces of data are identified based on a second time point at which the trigger condition is satisfied.

The apparatus, wherein the at least one instruction is configured to, when executed by the controller, cause the apparatus to encrypt at least one of position information of the vehicle or user information from the first sensor data or the second sensor data and store, in the storage device, the at least one of encrypted position information of the vehicle or encrypted user information.

According to the present disclosure, a method performed by a controller for a vehicle, the method comprising controlling, by using a sensor device, autonomous driving of the vehicle, wherein the controller is operatively coupled to the sensor device, temporarily storing, in at least one buffer of a first memory of a first type, first sensor data, wherein the first sensor data is associated with the autonomous driving of the vehicle, and the first sensor data is obtained using the sensor device, transferring, from the at least one buffer to a storage device of a second type and based on the first sensor data satisfying a preliminary condition, the first sensor data, temporarily storing, in the at least one buffer of the first memory, second sensor data, wherein the second sensor data is associated with the first sensor data, and performing one of: based on the second sensor data satisfying a trigger condition, transferring, from the at least one buffer to the storage device, at least a portion of the second sensor data and maintaining the first sensor data in the storage device; or based on the second sensor data not satisfying the trigger condition, removing the first sensor data from the storage device.

The method, wherein the storing, in the storage device, the second sensor data comprises preventing storing information in the storage device, wherein the information is duplicate pieces of information in both the first sensor data and the second sensor data.

The method, wherein the first type corresponds to volatile memory and the second type corresponds to non-volatile memory.

The method, wherein each of the preliminary condition and the trigger condition comprises at least one of whether a brake pedal operates, a target setting speed value, a current speed measurement value, or a forward object position estimation value.

The method, wherein the preliminary condition comprises at least one of: the brake pedal not operating; the current speed measurement value being greater than or equal to a first measurement value; or the forward object position estimation value being less than or equal to a first distance value.

The method, wherein the trigger condition comprises at least one of: the brake pedal not operating; the target setting speed value being greater than or equal to a first setting speed value; the current speed measurement value being greater than or equal to a second measurement value that is greater than the first measurement value; or the forward object position estimation value being less than or equal to a second distance value smaller than the first distance value.

The method, wherein the first sensor data comprises first pieces of data for the autonomous driving of the vehicle, wherein the first pieces of data are identified based on a first time point at which the preliminary condition is satisfied; and wherein the second sensor data comprises second pieces of data for the autonomous driving, wherein the second pieces of data are identified based on a second time point at which the trigger condition is satisfied.

According to the present disclosure, a non-transitory computer-readable storage medium storing a program, when executed, causes a controller to perform controlling, by using a sensor device, autonomous driving of a vehicle, wherein the controller is operatively coupled to the sensor device, temporarily storing, in at least one buffer of a first memory of a first type, first sensor data, wherein the first sensor data is associated with autonomous driving of the vehicle, and the first sensor data is obtained using the sensor device, transferring, from the at least one buffer to a storage device of a second type and based on the first sensor data satisfying a preliminary condition, the first sensor data, temporarily storing, in the at least one buffer of the first memory, second sensor data, wherein the second sensor data is associated with the first sensor data, and performing one of: based on the second sensor data satisfying a trigger condition, transferring, from the at least one buffer to the storage device, at least a portion of the second sensor data and maintaining the first sensor data in the storage device; or based on the second sensor data not satisfying the trigger condition, removing the first sensor data from the storage device.

The non-transitory computer-readable storage medium, wherein the storing, in the storage device, the second sensor data comprises preventing storing information in the storage device, wherein the information is duplicate pieces of information in both the first sensor data and the second sensor data.

The non-transitory computer-readable storage medium, wherein the first type is volatile memory and the second type is non-volatile memory.

The non-transitory computer-readable storage medium, wherein each of the preliminary condition and the trigger condition comprises at least one of whether a brake pedal operates, a target setting speed value, a current speed measurement value, or a forward object position estimation value.

The non-transitory computer-readable storage medium, wherein the first sensor data comprises first pieces of data for the autonomous driving of the vehicle, wherein the first pieces of data are identified based on a first time point at which the preliminary condition is satisfied; and wherein the second sensor data comprises second pieces of data for the autonomous driving, wherein the second pieces of data are identified based on a second time point at which the trigger condition is satisfied.

BRIEF DESCRIPTION OF THE DRAWINGS

The above and other objects, features and advantages of the present disclosure will be more apparent from the following detailed description taken in conjunction with the accompanying drawings:

FIG. 5 shows examples of conditions a condition about a trigger according to an example of the present disclosure.

Figure 1:
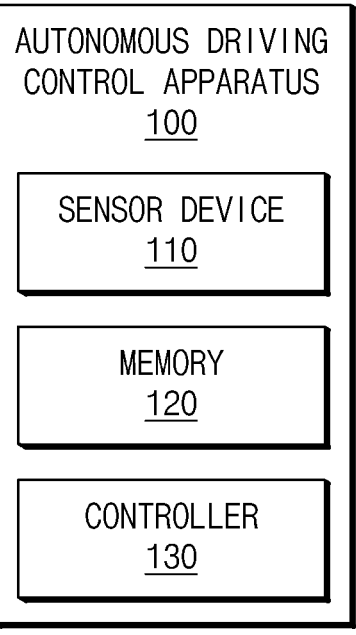
FIG. 1 shows example components of an autonomous driving control apparatus according to an example of the present disclosure.

With regard to description of drawings, the same or similar denotations may be used for the same or similar components.

DETAILED DESCRIPTION

Hereinafter, some examples of the present disclosure will be described in detail with reference to the exemplary drawings. In adding the reference numerals to the components of each drawing, it should be noted that the identical component is designated by the identical numerals even when they are displayed on other drawings. In addition, a detailed description of well-known features or functions will be ruled out in order not to unnecessarily obscure the gist of the present disclosure.

In describing the components of the example according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, examples of the present disclosure will be described in detail with reference to FIGS. 1 to 6.

FIG. 1 shows example components of an autonomous driving control apparatus according to an example of the present disclosure.

According to an example, an autonomous driving control apparatus 100 may include a sensor device 110, a memory 120, and a controller 130. The components of the autonomous driving control apparatus 100, which are shown in FIG. 1, are illustrative, and examples of the present disclosure are not limited thereto. For example, the autonomous driving control apparatus 100 may further include components (e.g., at least one of a communication device, an interface, a display, or a notification device, or any combination thereof) which are not shown in FIG. 1.

According to an example, the sensor device 110 may obtain various pieces of data about a host vehicle.

For example, the sensor device 110 may include at least one sensor including at least one of a camera, radio detection and ranging (RADAR), or light detection and ranging (Li-DAR), or any combination thereof.

For example, the sensor device 110 may obtain pieces of data (e.g., first sensor data and/or second sensor data) about autonomous driving control of the host vehicle. As an example, the sensor device 110 may obtain pieces of data including at least one of a real-time driving speed of the host vehicle, real-time driving acceleration of the host vehicle, a target setting speed set based on autonomous control, target setting acceleration, a driving direction, a distance to a destination, or whether a component for driving of the host vehicle operates, or any combination thereof.

For example, the sensor device 110 may obtain pieces of data including at least one of whether a brake pedal operates (or whether a user is pressing the brake pedal with a part of his or her body), a target setting speed for autonomous driving, a current speed measurement value (or a real-time driving speed) of the host vehicle, a forward object position estimation value, or any combination thereof.

For example, the forward object position estimation value may include an estimated value about a separation distance between an external object presenting in front of the host vehicle and the host vehicle.

According to an example, the memory 120 may store a command or data. For example, the memory 120 may store one or more instructions, when executed by the controller 130, causing the autonomous driving control apparatus 100 to perform various operations.

For example, the memory 120 and the controller 130 may be implemented as one chipset. The controller 130 may include at least one of a communication processor or a modem.

For example, the memory 120 may store various pieces of information associated with the autonomous driving control apparatus 100. As an example, the memory 120 may store information about an operation history of the controller 130. As an example, the memory 120 may store information associated with states and/or operations of components (e.g., at least one of an engine control unit (ECU), the sensor device 110, a driving device, an input device, or a notification device, or any combination thereof) of the host vehicle.

For example, the memory 120 may include different types of a plurality of storage devices. For example, the memory 120 may include at least one of a volatile memory (e.g., a random-access memory (RAM), a high bandwidth memory (HBM), or other first types of memories accessible by one or more processors for faster processing) or a non-volatile memory (e.g., an embedded multi-media card (eMMC), a solid state drive (SSD), a hard disk drive, or other second types of non-volatile storage devices, which may provide slower processing than the first types of memories), or any combination thereof.

As an example, the RAM may temporarily store data (e.g., sensor data) about an operation of the autonomous driving control apparatus 100 and/or the host vehicle which is a control target of the autonomous driving control apparatus 100. The RAM may include, for example, at least a temporary storage area (e.g., a buffer) that holds data while it is being transferred from one place to another. The RAM may operate to access data significantly faster than eMMC. But, the eMMC may be able to store a lot more data than the RAM and thus more cost-effective for large storage capacities compared to the RAM.

As an example, the eMMC may include a built-in or a portable multimedia card (e.g., a portable hard drive or solid state drive (SSD), etc.). The eMMC may store data for a longer time than the RAM. The eMMC may be implemented as, for example, a separate memory chip separately from the RAM or independent of the RAM.

According to an example, the controller 130 may be operatively connected with the sensor device 110 and/or the memory 120. For example, the controller 130 may control an operation of the memory 120.

Figure 2:
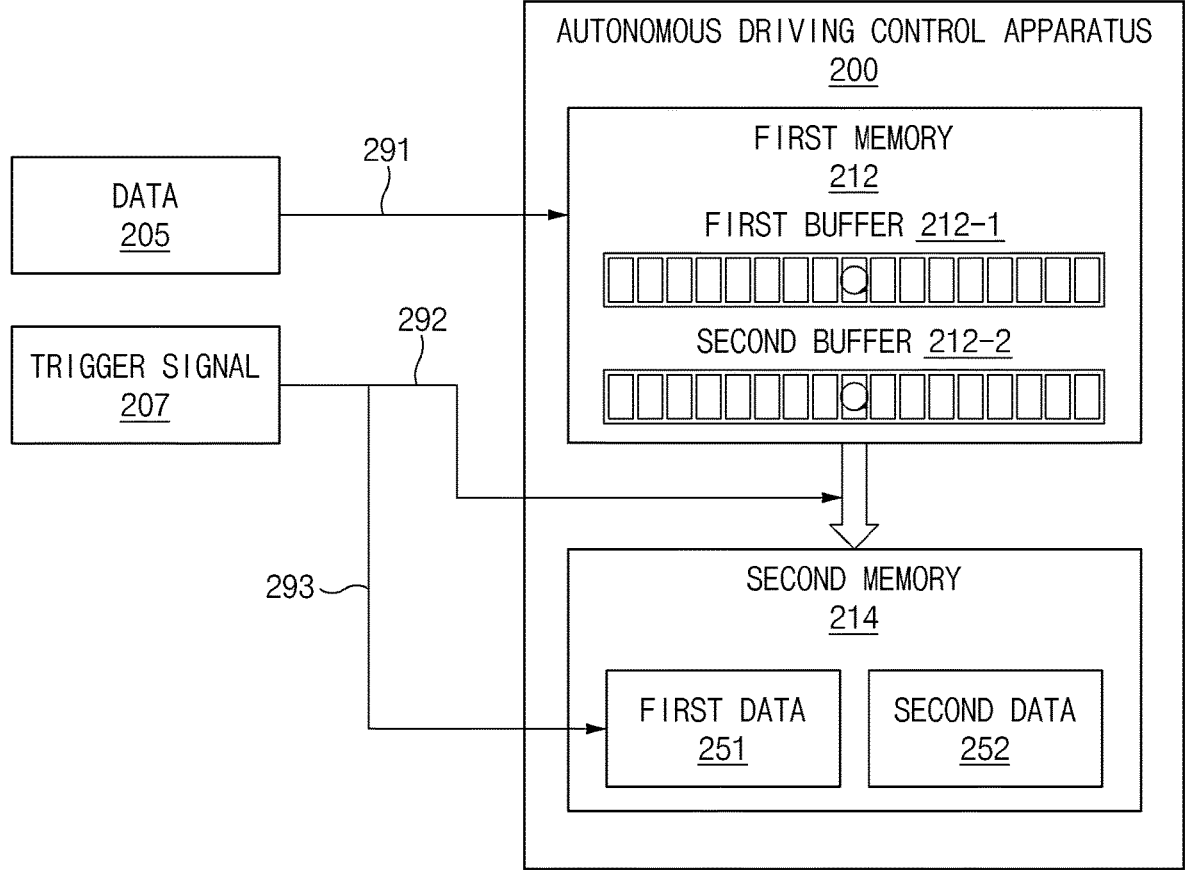
FIG. 2 shows example components and an example operation of an autonomous driving control apparatus according to an example of the present disclosure.

For example, the controller 130 may store first sensor data about autonomous driving control of the host vehicle, which is obtained using the sensor device 110, in at least one buffer (e.g., a volatile memory, a first memory 212 of FIG. 2).

For example, the controller 130 may identify whether the first sensor data meets a sub-condition (e.g., a first condition) about a sub trigger (e.g., a temporary trigger).

As an example, if the first sensor data meets the first condition about the sub trigger, the controller 130 may identify that the sub trigger is generated and may store the first sensor data in a storage device (e.g., a non-volatile memory, a second memory 214 of FIG. 2). The storage device may be, for example, one component of the memory 120, which is independent of the at least one buffer.

As an example, the first sensor data stored in the storage device by the controller 130 may include data about autonomous driving control, which is identified during a specified duration with respect to a time point when the sub trigger is generated (or a time when it is determined that the sub trigger is generated). The specified duration may be defined as, for example, a duration from before a first time (e.g., 20-30 seconds) with respect to the time point when the sub trigger is generated to after a second time (e.g., 20-30 seconds) with respect to the time point when the sub trigger is generated.

For example, the controller 130 may store second sensor data associated with the first sensor data obtained using the sensor device 110 in the at least one buffer. The second sensor data may include at least one piece of data obtained about autonomous driving control for the host vehicle after obtaining the first sensor data. The second sensor data may include, for example, data duplicated with at least a portion of the first sensor data.

For example, the controller 130 may identify whether the second sensor data meets a main condition (e.g., a second condition) about a main-trigger (e.g., a regular trigger).

As an example, if the second sensor data meets the second condition about the main-trigger, the controller 130 may identify that the main-trigger is generated and may store the second sensor data in the storage device (e.g., a non-volatile memory, eMMC). The storage device may be, for example, one component of the memory 120, which is independent of the at least one buffer (e.g., a buffer of a volatile memory such as a RAM).

As an example, the second sensor data stored in the storage device by the controller 130 may include data about autonomous driving control, which is identified during a specified duration with respect to a time point when the main-trigger is generated (or a time when it is determined that the main-trigger is generated). The specified duration may be defined as, for example, a duration from before a first time (e.g., 20-30 seconds) with respect to the time point when the main-trigger is generated to after a second time (e.g., 20-30 seconds) with respect to the time point when the main-trigger is generated.

As an example, the controller 130 may fail to store information duplicated with the first sensor data among pieces of information included in the second sensor data, in the process of storing the second sensor data in the storage device.

As an example, if the second sensor data does not meet the second condition, the controller 130 may fail or avoid to store the second sensor data in the storage device. At this time, the controller 130 may delete the first sensor data previously stored in the storage device from the storage device.

As an example, each of the first condition and the second condition may include at least one of whether the brake pedal operates, a target setting speed value, a current speed measurement value, or a forward object position estimation value, or any combination thereof.

As an example, the first condition may include at least one of the brake pedal not operating, the current speed measurement value being greater than or equal to a first measurement value, or the forward object position estimation value being less than or equal to a first distance value, or any combination thereof.

As an example, the second condition may include at least one of the brake pedal not operating, the target setting speed value being greater than or equal to a first setting speed value, the current speed measurement value being greater than or equal to a second measurement value greater than the first measurement value, or the forward object position estimation value being less than or equal to a second distance value that is smaller than the first distance value, or any combination thereof.

In other words, the first condition may include a relatively less conservatively or strictly set condition than the second condition. In other words, if the sensor data meets the second condition, it may also meet the first condition. Thus, the controller 130 may first identify whether the identified first sensor data meets the first condition, may determine that the sub trigger is generated when it is identified that the first sensor data meets the first condition to store the first sensor data in the storage device, and may store the second sensor data together with the first sensor data in the storage device (e.g., a non-volatile memory), if the second sensor data identified at a time point after the stored first sensor data meets the second condition. In this case, the storage of data about pieces of duplicated information between the second sensor data and the first sensor data may be omitted (e.g., not stored or deleted) in the process of storing the second sensor data. Furthermore, if the second sensor data identified after storing the first sensor data in the storage device does not meet the second condition, the controller 130 may delete the first sensor data from the storage device and may fail or avoid to store the second sensor data.

For example, the controller 130 may encrypt pieces of data about personal information before storing the pieces of data in the memory 120 (e.g., a RAM or an eMMC).

For example, the controller 130 may encrypt and store pieces of sensitive information, such as at least one of position information of the host vehicle or user information, or any combination thereof, between the first sensor data and the second sensor data before storing the sensitive information in the storage device (e.g., a non-volatile memory, an eMMC, a SSD card).

FIG. 2 shows example components and an example operation of an autonomous driving control apparatus according to an example of the present disclosure.

According to an example, an autonomous driving control apparatus 200 (e.g., an autonomous driving control apparatus 100 of FIG. 1) may include a first memory 212 (e.g., a volatile memory or a RAM) and a second memory 214 (e.g., a non-volatile memory, an eMMC, or SSD card). For example, the first memory 212 and the second memory 214 may be implemented as one device (e.g., a memory 120 of FIG. 1) or separate devices. For example, the first memory 212 and the second memory 214 may be operatively connected with a controller (e.g., a controller 130 of FIG. 1). For example, the first memory 212 and the second memory 214 may be electrically connected with each other to transmit and receive data.

For example, the first memory 212 may include at least one buffer (212-1 and 212-2).

As an example, the first memory 212 may include a first buffer 212-1 and a second buffer 212-2.

Referring to reference numeral 291, according to an example, the autonomous driving control apparatus 200 may sequentially store data 205 generated (or obtained) while performing autonomous driving control for a host vehicle in the at least one buffer included in the first memory 212 (e.g., a volatile memory or a RAM).

As an example, the second memory 214 may include a storage space for storing data and/or a controller. The second memory 214 may be, for example, a non-volatile memory, an embedded multi-media card (eMMC), or an SSD card.

Reference numerals 292 and 293, according to an example, the autonomous driving control apparatus 200 may identify (or detect) a trigger signal 207. If the trigger signal 207 is detected or received, the autonomous driving control apparatus 200 may store data in the second memory 214 in a different scheme depending on a type of the trigger signal 207. The type of the trigger signal 207 may include, for example, a sub trigger (e.g., associated with the first condition) and/or a main-trigger (e.g., associated with the second condition that is more strictly set condition than the first condition).

Referring to reference numeral 292, as an example, if the trigger signal 207 is identified, the autonomous driving control apparatus 200 may store second data 252 corresponding to the trigger signal 207 among pieces of data stored in the at least one buffer (212-1 and 212-2) in the second memory 214.

For example, the autonomous driving control apparatus 200 may identify whether some of the pieces of data stored in the at least one buffer (212-1 and 212-2) meet a sub-condition about the sub trigger. For example, first sensor data (e.g., the second data 252) among the pieces of stored data meets the first condition about the sub trigger, as shown, the autonomous driving control apparatus 200 may store the first sensor data stored in the at least one buffer (212-1 and 212-2) in the second memory 214.

For example, the autonomous driving control apparatus 200 may move and store the first sensor data corresponding to a specified duration identified on the basis of a time point if the trigger signal 207 is identified (or generated) from the at least one buffer (212-1 and 212-2) to the second memory 214.

Although not illustrated, after storing the first sensor data in the second memory 214, the autonomous driving control apparatus 200 may obtain and store the second sensor data in the at least one buffer (212-1 and 212-2). If identifying that the second sensor data meets a main condition which is independent of the first condition and is about the main-trigger, the autonomous driving control apparatus 200 may store the second sensor data stored in the at least one buffer (212-1 and 212-2) in the second memory 214.

Referring to reference numeral 293, as an example, if the trigger signal 207 corresponds to a predefined event, the autonomous driving control apparatus 200 may immediately store first data 251 about the event in the second memory 214 without passing through the first memory 212 (or the at least one buffer (212-1 and 212-2)).

Figure 3:
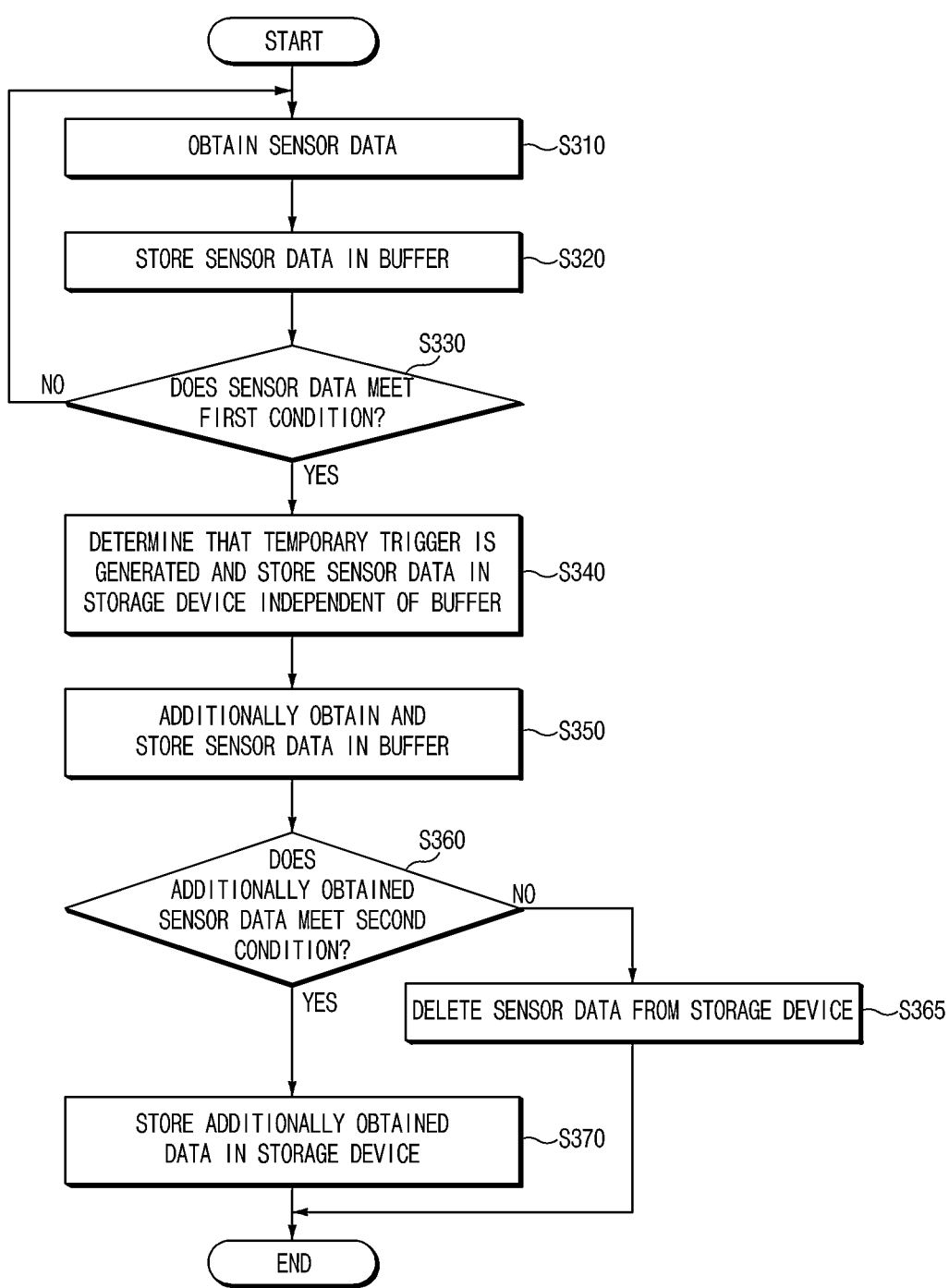
FIG. 3 shows an example flowchart of an autonomous driving control method according to an example of the present disclosure.

FIG. 3 shows an example flowchart of an autonomous driving control method according to an example of the present disclosure.

According to an example, an autonomous driving control apparatus (e.g., an autonomous driving control apparatus 100 of FIG. 1) may perform operations disclosed in FIG. 3. For example, at least some of components (e.g., a sensor device 110, a memory 120, and a controller 130 of FIG. 1) included in the autonomous driving control apparatus may be configured to perform the operations of FIG. 3.

Operations in S310 to S370 in an example below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 3, may be briefly described or omitted.

According to an example, in S310, the autonomous driving control apparatus may collect pieces of data about autonomous driving control of a host vehicle.

For example, the autonomous driving control apparatus may obtain (or collect) piece of sensor data generated while performing autonomous driving control for the host vehicle, using a sensor device (e.g., LiDAR sensor).

According to an example, in S320, the autonomous driving control apparatus may store the sensor data in a volatile memory (e.g., a buffer).

For example, the autonomous driving control apparatus may store the sensor data in at least one buffer which is a sub storage space (e.g., a RAM) in a memory.

According to an example, in S330, the autonomous driving control apparatus may identify whether the sensor data meets a sub-condition (e.g., a first condition set less strictly than a second condition or a main-condition).

For example, the first condition may include at least one condition for determining whether a sub trigger is generated.

For example, if the sensor data meets the first condition (e.g., S330—YES), the autonomous driving control apparatus may perform S340.

For example, if the sensor data does not meet the first condition (e.g., S330—NO), the autonomous driving control apparatus may repeatedly perform S310.

According to an example, in S340, the autonomous driving control apparatus may determine that the sub trigger is generated and may store the sensor data in a storage device (e.g., a non-volatile memory, an eMMC, or an SSD card, etc.) independent of the buffer or different from the buffer (e.g., a volatile memory or a RAM).

For example, the storage device may include a storage space which is included in the memory and is independent of the at least one buffer. The storage device may include, for example, a non-volatile memory, an eMMC, or an SSD card. The storage device may include a device which stores data for a relatively longer duration than the at least one buffer (e.g., a volatile memory or a RAM).

According to an example, in S350, the autonomous driving control apparatus may additionally acquire (or, add and store) sensor data in the buffer (e.g., a volatile memory or a RAM).

According to an example, in S360, the autonomous driving control apparatus may identify whether the additionally obtained sensor data meets a main condition (e.g., the second condition that is set more strictly than the first condition or a sub-condition).

For example, the second condition may include at least one condition for determining whether a main-trigger is generated.

For example, if the sensor data meets the second condition (e.g., S360—YES), the autonomous driving control apparatus may perform S370.

For example, if the sensor data does not meet the second condition (e.g., S360—NO), the autonomous driving control apparatus may perform S365.

According to an example, in S370, the autonomous driving control apparatus may store the additionally obtained data in the storage device.

For example, in S370, the autonomous driving control apparatus may fail to store duplicated data between the data additionally obtained in S350 and the data stored in the storage device (e.g., a non-volatile memory, an eMMC, or an SSD card, etc.) in S340.

According to an example, in S365, the autonomous driving control apparatus may delete the sensor data from the storage device.

For example, the autonomous driving control apparatus may delete the sensor data stored in S340 from the storage device (e.g., a non-volatile memory, an eMMC, or an SSD card, etc.).

Figure 4:
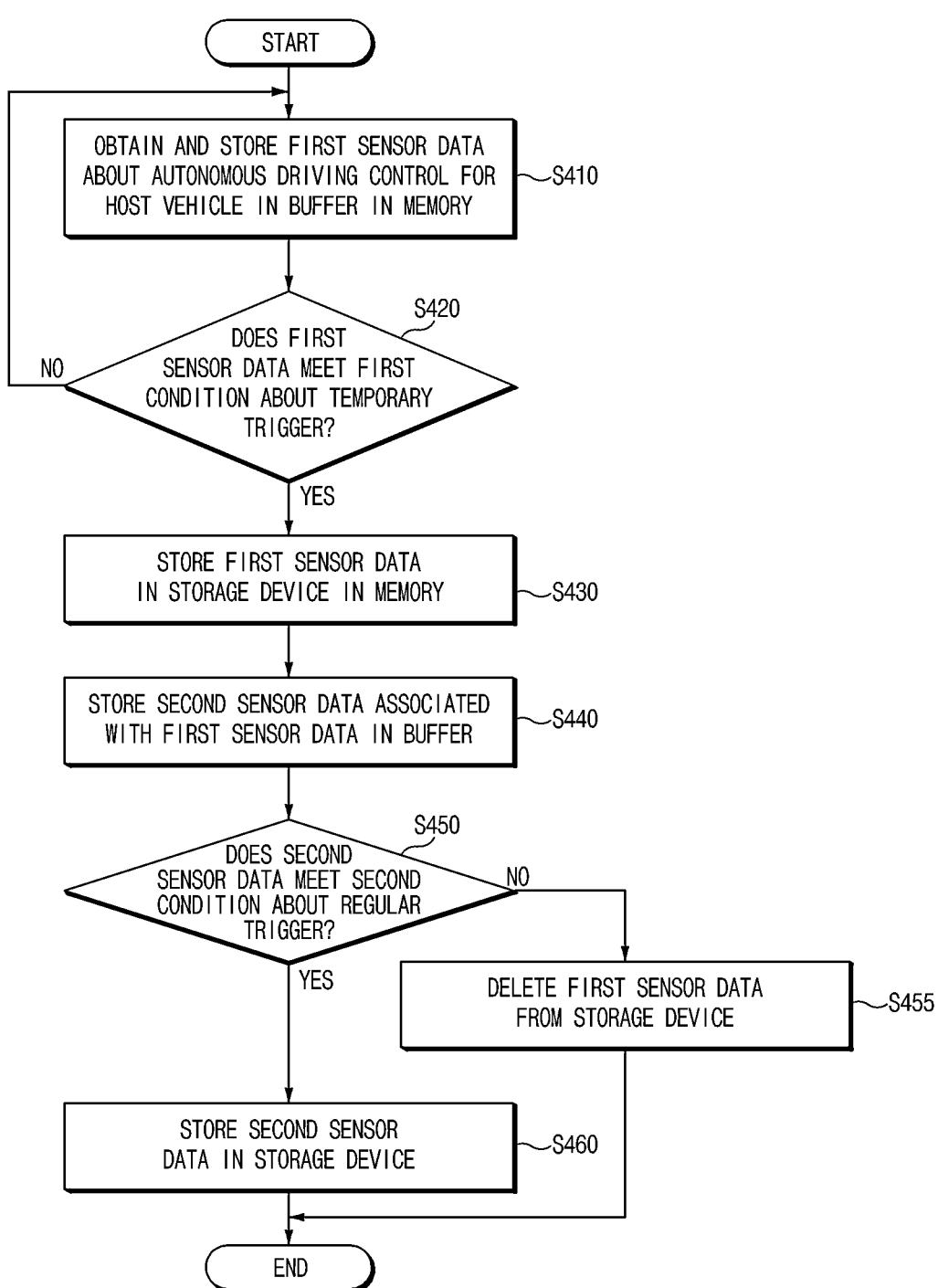
FIG. 4 shows an example flowchart of an autonomous driving control method according to an example of the present disclosure.

FIG. 4 shows an example flowchart of an autonomous driving control method according to an example of the present disclosure.

According to an example, an autonomous driving control apparatus (e.g., an autonomous driving control apparatus 100 of FIG. 1) may perform operations disclosed in FIG. 4. For example, at least some of components (e.g., a sensor device 110, a memory 120, and a controller 130 of FIG. 1) included in the autonomous driving control apparatus may be configured to perform the operations of FIG. 4.

Operations in S410 to S460 in an example below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 4, may be briefly described or omitted.

According to an example, in S410, the autonomous driving control apparatus may acquire (or, obtain and store) first sensor data about autonomous driving control for a host vehicle in a buffer (e.g., a volatile memory) in a memory.

According to an example, in S420, the autonomous driving control apparatus may identify whether the first sensor data meets a sub-condition about a sub trigger (e.g., a first condition that is less strictly set than a second condition or a main-condition about a main-trigger).

According to an example, the autonomous driving control apparatus may identify whether the first sensor data meets the first condition.

For example, the first condition may include at least one condition for determining whether the sub trigger is generated.

For example, if the first sensor data meets the first condition (e.g., S420—YES), the autonomous driving control apparatus may perform S430.

For example, if the first sensor data does not meet the first condition (e.g., S430—NO), the autonomous driving control apparatus may repeatedly perform S410.

According to an example, in S430, the autonomous driving control apparatus may determine that the sub trigger is generated and may store the first sensor data in a storage device (e.g., a non-volatile memory, an eMMC, or an SSD card, etc.) in the memory.

For example, the storage device may include a storage space which is included in the memory and is independent of at least one buffer (e.g., a volatile memory or a RAM). The storage device may include, for example, a non-volatile memory, an eMMC, or an SSD card. The storage device may include a device which stores data for a relatively longer duration than the at least one buffer (e.g., a volatile memory or a RAM).

According to an example, in S440, the autonomous driving control apparatus may store second sensor data associated with the first sensor data in the buffer.

According to an example, in S450, the autonomous driving control apparatus may identify whether the second sensor data meets a main condition about a main-trigger (e.g., a second condition that is set more strictly than the first condition or the sub-condition about a sub trigger).

For example, the second condition may include at least one condition for determining whether the main-trigger is generated.

For example, if the second sensor data meets the second condition (e.g., S450—YES), the autonomous driving control apparatus may perform S460.

For example, if the second sensor data does not meet the second condition (e.g., S450—NO), the autonomous driving control apparatus may perform S455.

According to an example, in S460, the autonomous driving control apparatus may store the second sensing data in the storage device (e.g., a non-volatile memory, an eMMC, or an SSD card, etc.).

For example, in S460, the autonomous driving control apparatus may fail or avoid to store duplicated data between the sensor data additionally obtained in S440 and the first data stored in the storage device in S430.

According to an example, in S455, the autonomous driving control apparatus may delete the first sensor data from the storage device.

For example, the autonomous driving control apparatus may delete the first sensor data stored in S430 from the storage device.

FIG. 5 shows examples of conditions a condition about a trigger according to an example of the present disclosure.

Referring to FIG. 5, according to an example, an autonomous driving control apparatus (e.g., an autonomous driving control apparatus 100 of FIG. 1) may identify whether data obtained about autonomous driving control of a host vehicle is greater than or meets a threshold about a main-trigger and/or a sub trigger (meets a condition).

For example, a sub-condition about the sub trigger may include at least one of if a brake pedal is not operating, if a current speed measurement value is greater than or equal to a first measurement value (e.g., 30-40 km/h), or if a forward object position estimation value is less than or equal to a first distance value (e.g., 80-100 m), or any combination thereof.

In other words, if sensor data meets the first condition, the autonomous driving control apparatus may identify that the sub trigger is generated based on the sensor data and may store sensor data identified during a specified duration with respect to a time point if the sub trigger is generated in a memory (e.g., a storage device in the memory).

The specified duration may be defined as, for example, a duration including previous 20-30 seconds with respect to a specific time point and subsequent 20-30 seconds with respect to the specific time point. Such numbers are illustrative, and examples of the present disclosure are not limited thereto.

For example, a main condition about the main-trigger may include at least one of the brake pedal not operating, a target setting speed being greater than or equal to a first setting speed (e.g., 50-60 km/h), the current speed measurement value being greater than or equal to a second measurement value greater than the first measurement value, or the forward object position estimation value being less than or equal to a second distance value that is smaller than the first distance value, or any combination thereof.

In other words, if the sensor data meets the second condition, the autonomous driving control apparatus may identify that the main-trigger is generated based on the sensor data and may store sensor data identified during a specified duration with respect to a time point when the main-trigger is generated in the memory (e.g., the storage device in the memory).

Figure 6:
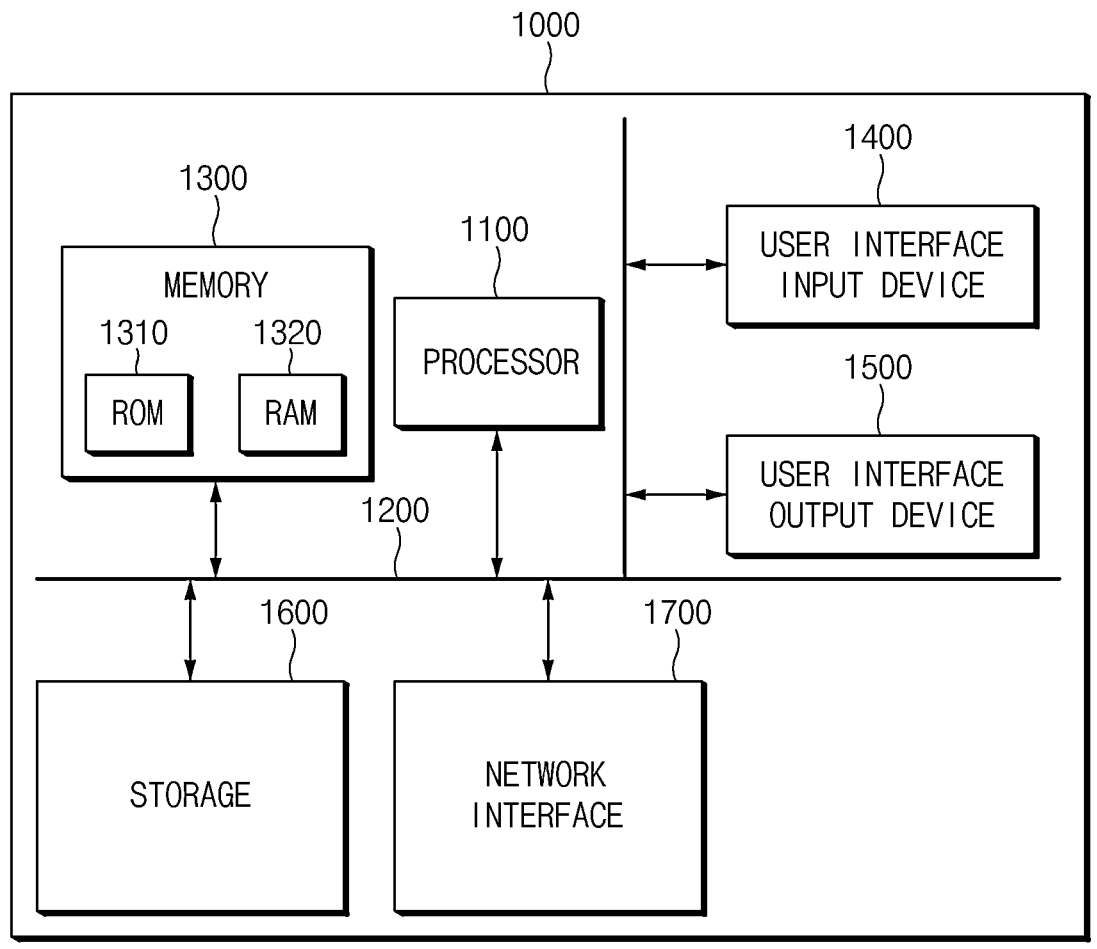
FIG. 6 shows an example of a computing system about an autonomous driving control apparatus or an autonomous driving control method according to an example of the present disclosure.

FIG. 6 shows an example of a computing system about an autonomous driving control apparatus or an autonomous driving control method according to an example of the present disclosure.

Referring to FIG. 6, a computing system 1000 about the autonomous driving control apparatus or the autonomous driving control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present disclosure has been made to solve the abovementioned problems occurring in the prior art while advantages achieved by the prior art are maintained intact.

An example of the present disclosure provides an autonomous driving control apparatus for first storing identified sensor data in a storage device (e.g., an embedded multimedia card (eMMC)), if the sensor data meeting a first conservatively set condition is identified in the process of performing autonomous driving control of a host vehicle, and storing all of the data and pieces of sensor data obtained later in the storage device, if the pieces of sensor data obtained later meet a condition for a main-trigger.

Another example of the present disclosure provides an autonomous driving control apparatus for deleting pieces of data stored as a condition about a sub trigger is met from a storage device, if identifying that a condition about a main-trigger is not met.

Another example of the present disclosure provides an autonomous driving control apparatus for first storing pieces of data in which a condition about a sub trigger is met to perform an efficient data storage algorithm for quickly storing only pieces of newly obtained data without storing previously stored data in the process of storing pieces of data in which a condition about a main-trigger is met later.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, an autonomous driving control apparatus may include a sensor device, a memory storing at least one instruction and including at least one buffer and a storage device independent of the at least one buffer, and a controller operatively connected with the sensor device and the memory. For example, the at least one instruction may be configured to, when executed by the controller, cause the autonomous driving control apparatus to store first sensor data about autonomous driving control of a host vehicle, the first sensor data being obtained using the sensor device, in the at least one buffer, store the first sensor data in the storage device, if the first sensor data meets a sub-condition about a sub trigger, store second sensor data associated with the first sensor data obtained using the sensor device in the at least one buffer, and store the second sensor data in the storage device, if the second sensor data meets a main condition about a main-trigger.

According to an example, the at least one instruction may be configured to, when executed by the controller, cause the autonomous driving control apparatus to fail to store information duplicated with the first sensor data among pieces of information included in the second sensor data.

According to an example, the at least one instruction may be configured to, when executed by the controller, cause the autonomous driving control apparatus to delete the first sensor data from the storage device, if the second sensor data does not meet the second condition.

According to an example, each of the first condition and the second condition may include at least one of whether a brake pedal operates, a target setting speed, a current speed measurement value, or a forward object position estimation value, or any combination.

According to an example, the first condition may include at least one of the brake pedal not operating, the current speed measurement value being greater than or equal to a first measurement value, or the forward object position estimation value being less than or equal to a first distance, or any combination thereof.

According to an example, the second condition may include at least one of the brake pedal not operating, the target setting speed being greater than or equal to a first setting speed, the current speed measurement value being greater than or equal to a second measurement value that is greater than the first measurement value, or the forward object position estimation value being less than or equal to a second distance smaller than the first distance, or any combination thereof.

According to an example, the first sensor data and the sensor data may include pieces of data about the autonomous driving control, the pieces of data being identified during a specified duration with respect to time points when the sub trigger and the main-trigger are generated, respectively.

According to an example, the at least one instruction may be configured to, when executed by the controller, cause the autonomous driving control apparatus to encrypt and store at least one of position information of the host vehicle or user information, or any combination thereof between the first sensor data and the second sensor data in the storage device.

According to another example of the present disclosure, an autonomous driving control method may include storing, by a controller, first sensor data about autonomous driving control of a host vehicle, the first sensor data being obtained using a sensor device, in at least one buffer included in a memory, storing, by the controller, the first sensor data in a storage device independent of the at least one buffer, if the first sensor data meets a sub-condition about a sub trigger, storing, by the controller, second sensor data associated with the first sensor data obtained using the sensor device in the at least one buffer, and storing, by the controller, the second sensor data in the storage device, if the second sensor data meets a main condition about a main-trigger.

According to an example, the storing of the second sensor data in the storage device by the controller, if the second sensor data meets the second condition about the main-trigger, may include failing, by the controller, to store information duplicated with the first sensor data among pieces of information included in the second sensor data.

According to an example, the autonomous driving control method may further include deleting, by the controller, the first sensor data from the storage device, if the second sensor data does not meet the second condition.

According to an example, each of the first condition and the second condition may include at least one of whether a brake pedal operates, a target setting speed, a current speed measurement value, or a forward object position estimation value, or any combination.

According to an example, the first condition may include at least one of the brake pedal not operating, the current speed measurement value being greater than or equal to a first measurement value, or the forward object position estimation value being less than or equal to a first distance, or any combination thereof.

According to an example, the second condition may include at least one of the brake pedal not operating, the target setting speed being greater than or equal to a first setting speed, the current speed measurement value being greater than or equal to a second measurement value that is greater the first measurement value, or the forward object position estimation value being less than or equal to a second distance that is smaller than the first distance, or any combination thereof.

According to an example, the first sensor data and the sensor data may include pieces of data about the autonomous driving control, the pieces of data being identified during a specified duration with respect to time points when the sub trigger and the main-trigger are generated, respectively.

According to another example of the present disclosure, a storage medium may include a program for executing an autonomous driving control method including storing, by a controller, first sensor data about autonomous driving control of a host vehicle, the first sensor data being obtained using a sensor device, in at least one buffer included in a memory, storing, by the controller, the first sensor data in a storage device independent of the at least one buffer, if the first sensor data meets a sub-condition about a sub trigger, storing, by the controller, second sensor data associated with the first sensor data obtained using the sensor device in the at least one buffer, and storing, by the controller, the second sensor data in the storage device, if the second sensor data meets a main condition about a main-trigger.

According to an example, the storing of the second sensor data in the storage device by the controller, if the second sensor data meets the second condition about the main-trigger, may include failing, by the controller, to store information duplicated with the first sensor data among pieces of information included in the second sensor data.

According to an example, the autonomous driving control method may further include deleting, by the controller, the first sensor data from the storage device, if the second sensor data does not meet the second condition.

According to an example, each of the first condition and the second condition may include at least one of whether a brake pedal operates, a target setting speed, a current speed measurement value, or a forward object position estimation value, or any combination.

According to an example, the first sensor data and the sensor data may include pieces of data about the autonomous driving control, the pieces of data being identified during a specified duration with respect to time points if the sub trigger and the main-trigger are generated, respectively.

A description will be given of effects of the autonomous driving control apparatus and the method thereof according to an example of the present disclosure.

The autonomous driving control apparatus according to examples of the present disclosure may first store identified sensor data in a storage device (e.g., an embedded multimedia card (eMMC)), if the sensor data meeting a first conservatively set condition is identified in the process of performing autonomous driving control of the host vehicle, and may store all of the data and pieces of sensor data obtained later in the storage device, if the pieces of sensor data obtained later meet a condition for a main-trigger.

The autonomous driving control apparatus according to examples of the present disclosure may delete pieces of data stored as a condition about a sub trigger is met from the storage device, if identifying that the condition about the main-trigger is not met.

The autonomous driving control apparatus according to examples of the present disclosure may first store pieces of data in which the condition about the sub trigger is met, thus performing an efficient data storage algorithm for quickly storing only pieces of newly obtained data without storing previously stored data in the process of storing pieces of data in which the condition about the main-trigger is met later.

In addition, various effects ascertained directly or indirectly through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for a vehicle, the apparatus comprising:
a sensor device;
a memory storing at least one instruction; and
a controller operatively coupled to the sensor device and the memory,
wherein the at least one instruction is configured to, when executed by the controller, cause the apparatus to:
control, by using the sensor device, autonomous driving of the vehicle;
temporarily store, in at least one buffer of a first memory of a first type, first sensor data, wherein the first sensor data is associated with the autonomous driving of the vehicle, and the first sensor data is obtained using the sensor device;
transfer, from the at least one buffer to a storage device of a second type and based on the first sensor data satisfying a preliminary condition, the first sensor data;
temporarily store, in the at least one buffer of the first memory, second sensor data, wherein the second sensor data is associated with the first sensor data; and
perform one of:
based on the second sensor data satisfying a trigger condition, transferring, from the at least one buffer to the storage device, at least a portion of the second sensor data and maintaining the first sensor data in the storage device; or
based on the second sensor data not satisfying the trigger condition, removing the first sensor data from the storage device,
wherein each of the preliminary condition and the trigger condition comprises at least one of: whether a brake pedal operates, a target setting speed value, a current speed measurement value, or a forward object position estimation value, and
wherein the preliminary condition comprises at least one of: the brake pedal not operating, the current speed measurement value being greater than or equal to a first measurement value, or the forward object position estimation value being less than or equal to a first distance value.

2. The apparatus of claim 1, wherein the at least one instruction is configured to, when executed by the controller, cause the apparatus to:

prevent storing information in the storage device, wherein the information is duplicate pieces of information in both the first sensor data and the second sensor data.

3. The apparatus of claim 1, wherein the first type corresponds to volatile memory and the second type corresponds to non-volatile memory.

4. The apparatus of claim 1, wherein the trigger condition comprises at least one of:

the brake pedal not operating;

the target setting speed value being greater than or equal to a first setting speed value;

the current speed measurement value being greater than or equal to a second measurement value that is greater than the first measurement value; or the forward object position estimation value being less than or equal to a second distance value smaller than the first distance value.

5. The apparatus of claim 1, wherein the first sensor data comprises first pieces of data for the autonomous driving, wherein the first pieces of data are identified based on a first time point at which the preliminary condition is satisfied; and wherein the second sensor data comprises second pieces of data for the autonomous driving, wherein the second pieces of data are identified based on a second time point at which the trigger condition is satisfied.

6. The apparatus of claim 1, wherein the at least one instruction is configured to, when executed by the controller, cause the apparatus to:

encrypt at least one of position information of the vehicle or user information from the first sensor data or the second sensor data and store, in the storage device, the at least one of encrypted position information of the vehicle or encrypted user information.

7. The apparatus of claim 1, wherein the preliminary condition comprises the forward object position estimation value being less than or equal to the first distance value.

8. The apparatus of claim 1, wherein the trigger condition comprises the forward object position estimation value being less than or equal to a second distance value smaller than the first distance value.

9. A method performed by a controller for a vehicle, the method comprising:

controlling, by using a sensor device, autonomous driving of the vehicle, wherein the controller is operatively coupled to the sensor device;

temporarily storing, in at least one buffer of a first memory of a first type, first sensor data, wherein the first sensor data is associated with the autonomous driving of the vehicle, and the first sensor data is obtained using the sensor device;

transferring, from the at least one buffer to a storage device of a second type and based on the first sensor data satisfying a preliminary condition, the first sensor data;

temporarily storing, in the at least one buffer of the first memory, second sensor data, wherein the second sensor data is associated with the first sensor data; and performing one of:

based on the second sensor data satisfying a trigger condition, transferring, from the at least one buffer to the storage device, at least a portion of the second sensor data and maintaining the first sensor data in the storage device; or based on the second sensor data not satisfying the trigger condition, removing the first sensor data from the storage device, wherein each of the preliminary condition and the trigger condition comprises at least one of: whether a brake pedal operates, a target setting speed value, a current speed measurement value, or a forward object position estimation value, and wherein the preliminary condition comprises at least one of: the brake pedal not operating, the current speed measurement value being greater than or equal to a first measurement value, or the forward object position estimation value being less than or equal to a first distance value.

10. The method of claim 9, wherein the storing, in the storage device, the second sensor data comprises:

preventing storing information in the storage device, wherein the information is duplicate pieces of information in both the first sensor data and the second sensor data.

11. The method of claim 9, wherein the first type corresponds to volatile memory and the second type corresponds to non-volatile memory.

12. The method of claim 9, wherein the trigger condition comprises at least one of:

the brake pedal not operating;

the target setting speed value being greater than or equal to a first setting speed value;

the current speed measurement value being greater than or equal to a second measurement value that is greater than the first measurement value; or the forward object position estimation value being less than or equal to a second distance value smaller than the first distance value.

13. The method of claim 9, wherein the first sensor data comprises first pieces of data for the autonomous driving, wherein the first pieces of data are identified based on a first time point at which the preliminary condition is satisfied; and wherein the second sensor data comprises second pieces of data for the autonomous driving, wherein the second pieces of data are identified based on a second time point at which the trigger condition is satisfied.

14. The method of claim 9, wherein the preliminary condition comprises the forward object position estimation value being less than or equal to the first distance value.

15. The method of claim 9, wherein the trigger condition comprises the forward object position estimation value being less than or equal to a second distance value smaller than the first distance value.

16. A non-transitory computer-readable storage medium storing a program, when executed, causes a controller to perform:

controlling, by using a sensor device, autonomous driving of a vehicle, wherein the controller is operatively coupled to the sensor device;

temporarily storing, in at least one buffer of a first memory of a first type, first sensor data, wherein the first sensor data is associated with autonomous driving of the vehicle, and the first sensor data is obtained using the sensor device;

transferring, from the at least one buffer to a storage device of a second type and based on the first sensor data satisfying a preliminary condition, the first sensor data;

temporarily storing, in the at least one buffer of the first memory, second sensor data, wherein the second sensor data is associated with the first sensor data; and performing one of:

based on the second sensor data satisfying a trigger condition, transferring, from the at least one buffer to the storage device, at least a portion of the second sensor data and maintaining the first sensor data in the storage device; or based on the second sensor data not satisfying the trigger condition, removing the first sensor data from the storage device, wherein each of the preliminary condition and the trigger condition comprises at least one of: whether a brake pedal operates, a target setting speed value, a current speed measurement value, or a forward object position estimation value, and wherein the preliminary condition comprises at least one of: the brake pedal not operating, the current speed measurement value being greater than or equal to a first measurement value, or the forward object position estimation value being less than or equal to a first distance value.

17. The non-transitory computer-readable storage medium of claim 16, wherein the storing, in the storage device, the second sensor data comprises:

preventing storing information in the storage device, wherein the information is duplicate pieces of information in both the first sensor data and the second sensor data.

18. The non-transitory computer-readable storage medium of claim 16, wherein the first type is volatile memory and the second type is non-volatile memory.

19. The non-transitory computer-readable storage medium of claim 16, wherein the first sensor data comprises first pieces of data for the autonomous driving of the vehicle, wherein the first pieces of data are identified based on a first time point at which the preliminary condition is satisfied; and wherein the second sensor data comprises second pieces of data for the autonomous driving, wherein the second pieces of data are identified based on a second time point at which the trigger condition is satisfied.

20. The non-transitory computer-readable storage medium of claim 16, wherein the preliminary condition comprises the forward object position estimation value being less than or equal to the first distance value, and wherein the trigger condition comprises the forward object position estimation value being less than or equal to a second distance value smaller than the first distance value.

* * * * *